United States Patent
Suzuki et al.

(10) Patent No.: US 9,644,941 B2
(45) Date of Patent: May 9, 2017

(54) GRAZING INCIDENCE INTERFEROMETER

(71) Applicant: MITUTOYO CORPORATION, Kanagawa (JP)

(72) Inventors: Yoshimasa Suzuki, Ibaraki (JP); Reiya Otao, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/621,691

(22) Filed: Feb. 13, 2015

(65) Prior Publication Data
US 2015/0241201 A1 Aug. 27, 2015

(30) Foreign Application Priority Data

Feb. 21, 2014 (JP) .................. 2014-031522

(51) Int. Cl.
*G01B 9/02* (2006.01)
*G01B 11/24* (2006.01)
(52) U.S. Cl.
CPC ..... *G01B 9/02022* (2013.01); *G01B 9/02067* (2013.01); *G01B 11/2441* (2013.01)
(58) Field of Classification Search
CPC ................................. G01B 9/02022
USPC ....................................... 356/491
See application file for complete search history.

(56) References Cited

U.S. PATENT DOCUMENTS

| 6,721,094 | B1* | 4/2004 | Sinclair | ..... G01B 9/04 356/445 |
| 2005/0226278 | A1* | 10/2005 | Gu | ..... H01S 3/0057 372/6 |
| 2006/0119858 | A1* | 6/2006 | Knighton | ..... A61B 3/102 356/479 |
| 2007/0206200 | A1* | 9/2007 | Lindner | ..... G01B 11/2441 356/511 |
| 2008/0002212 | A1 | 1/2008 | Kawasaki et al. | |
| 2008/0304071 | A1* | 12/2008 | Kallmann | ..... G01N 21/45 356/450 |
| 2009/0018436 | A1* | 1/2009 | Gey Van Pittius | .. A61B 5/0059 600/425 |
| 2009/0247862 | A1* | 10/2009 | Meyer et al. | ................. 600/425 |

(Continued)

FOREIGN PATENT DOCUMENTS

| JP | 2008-32690 | 2/2008 |
| JP | 2010-32342 | 2/2010 |

*Primary Examiner* — Tarifur Chowdhury
*Assistant Examiner* — Omar Nixon
(74) *Attorney, Agent, or Firm* — Greenblum & Bernstein, P.L.C.

(57) ABSTRACT

A grazing incidence interferometer is configured to measure a profile of a target surface using a measurement beam radiated on the target surface in a direction oblique to a normal line of the target surface and reflected on the target surface to cause an interference with a reference beam. The grazing incidence interferometer includes: a light source to emit light; a first polarization beam splitter that splits the light from the light source into the reference beam and the measurement beam; a ratio changer that changes a light amount ratio between the reference beam and the measurement beam; a second polarization beam splitter that synthesizes the measurement beam reflected on the target surface and the reference beam; and an image capturing camera that receives the synthesized beam of the reference beam and the measurement beam.

12 Claims, 8 Drawing Sheets

(56) References Cited

U.S. PATENT DOCUMENTS

| | | |
|---|---|---|
| 2010/0027028 A1 | 2/2010 | Kuriyama et al. |
| 2010/0079852 A1* | 4/2010 | Spronck .................. 359/301 |
| 2011/0001950 A1* | 1/2011 | DeVoe ................ G03F 7/2053 |
| | | 355/67 |
| 2011/0032536 A1* | 2/2011 | Kuriyama et al. ........... 356/512 |
| 2012/0120408 A1* | 5/2012 | Yasuno ................ A61B 3/102 |
| | | 356/479 |
| 2013/0003766 A1* | 1/2013 | Savchenkov et al. ..... 372/38.01 |
| 2013/0162952 A1* | 6/2013 | Lippey .................. G02B 27/48 |
| | | 353/7 |
| 2013/0178735 A1* | 7/2013 | Iddan .......................... 600/425 |
| 2014/0109117 A1* | 4/2014 | Ito .......................... G11B 7/005 |
| | | 720/695 |

\* cited by examiner

GRAZING INCIDENCE INTERFEROMETER

The entire disclosure of Japanese Patent Application No. 2014-031522 filed Feb. 21, 2014 is expressly incorporated by reference herein.

BACKGROUND OF THE INVENTION

1. Field of the Invention

The present invention relates to a grazing incidence interferometer.

2. Description of Related Art

A grazing incidence interferometer is typically known as a device for measuring a surface profile of a workpiece (see, for instance, Patent Literature 1: JP-A-2010-32342).

The grazing incidence interferometer splits light from a light source into a reference beam and a measurement beam and lets the measurement beam be obliquely incident onto a target surface. The grazing incidence interferometer synthesizes the measurement beam reflected on the target surface and the reference beam, monitors interference fringes caused by the measurement beam and the reference beam, and measures a surface profile of the target surface by a phase shift method.

In the grazing incidence interferometer as described above, the measurement beam emitted on the target surface forms an ellipse, so that the surface profile within the elliptical area can be measured. Accordingly, by mounting the workpiece on a rotary stage and continuously measuring the surface profile within the elliptical area while rotating the rotary stage, a profile of a target surface having a wider area can be measured (see, for instance, Patent Literature 2: JP-A-2008-32690).

However, when a machining mark or the like is left on the target surface of the workpiece, an amount of the reflection beam (light intensity of the reflection beam) is changed due to the machining mark depending on a direction of the incident beam. For this reason, when the workpiece is mounted on a rotary table and is continuously measured as described above, the amount of the reflection beam may be significantly changed to cause a difficulty in profile analysis of the interference fringes.

SUMMARY OF THE INVENTION

An object of the invention is to provide a grazing incidence interferometer capable of measuring a profile of a target surface with a high accuracy even when a machining mark or the like is left on the target surface.

According to an aspect of the invention, a grazing incidence interferometer configured to measure a profile of a target surface using a measurement beam radiated on the target surface in a direction oblique to a normal line of the target surface and reflected on the target surface to cause an interference with a reference beam, the grazing incidence interferometer including: a light source that emits light; a beam splitter that splits the light from the light source into the reference beam and the measurement beam; a ratio changer that changes a light amount ratio between the reference beam and the measurement beam; a light synthesizing unit that synthesizes the reference beam and the measurement beam reflected on the target surface; and a light receiver that receives a synthesized beam of the reference beam and the measurement beam.

In the grazing incidence interferometer according to the above aspect of the invention, the ratio changer can change a ratio between the light amount of the measurement beam (a light intensity of the measurement beam) and the light amount of the reference beam (a light intensity of the reference beam). With this arrangement, even when the reflected light amount is decreased, for instance, due to the machining mark or the like on the target surface, an increase in the light amount ratio of the measurement beam can inhibit a decrease in contrast of the interference fringes due to a shortage of the reflected light amount of the measurement beam, so that a highly accurate measurement result is obtainable. In other words, even when the machining mark or the like is left on the target surface, the above aspect of the invention allows a highly accurate profile measurement without being influenced by the machining mark or the like.

With this arrangement, preferably, the beam splitter splits the light from the light source into the reference beam with a first linear polarization direction and the measurement beam with a second linear polarization direction orthogonal to the first linear polarization direction, and the ratio changer comprises a $\lambda/2$ plate rotatable around a main optical axis of the light from the light source.

With this arrangement, the beam splitter splits the light from the light source into the measurement beam (in a first linear polarization direction) and the reference beam (in a second linear polarization direction), both of which having polarization directions orthogonal to each other. The ratio changer includes the $\lambda/2$ plate rotatable around the main optical axis of the light from the light source.

With this arrangement, since a polarization plane of the light from the light source is rotated by rotating the $\lambda/2$ plate, the light amount ratio between the measurement beam and the reference beam into which the beam splitter splits the light from the light source is also changed. In the above simple arrangement, the light amount ratio between the measurement beam and the reference beam can be easily changed.

The grazing incidence interferometer preferably further includes: a measurement-beam amount detection unit that detects a light amount of the measurement beam; and a light ratio controller that controls the ratio changer so that the light amount of the measurement beam falls within a predetermined range.

With this arrangement, the measurement-beam amount detection unit detects the light amount of the measurement beam and changes the light amount ratio of the measurement beam in the ratio changer so that the light amount of the measurement beam falls within the predetermined range not to affect a measurement accuracy. Accordingly, such an unexpected light amount caused by the machining mark or the like as described above is automatically inhibited, so that a highly accurate measurement can be conducted.

The grazing incidence interferometer according to the above aspect of the invention preferably further includes: a reference beam blocking unit that blocks a part of the reference beam, in which the measurement-beam amount detection unit detects a light amount of an area corresponding to the reference beam blocking unit in a light receiving area of the light receiver.

With this arrangement, the reference beam blocking unit that blocks the part of the reference beam is provided in a light path of the reference beam. With this arrangement, when the light synthesizing unit synthesizes the measurement beam and the reference beam, the reference beam is not synthesized with the measurement beam on the area corresponding to the reference beam blocking unit, so that only the measurement beam is received on the area of the light receiver corresponding to the reference beam blocking unit. By measuring the light amount on the area, the light amount of the measurement beam can be detected with a simple arrangement, for instance, without a separate detecting sensor for detecting the measurement beam.

The grazing incidence interferometer according to the above aspect of the invention preferably further includes: the measurement-beam amount detection unit comprises a measurement beam splitter that splits the measurement beam to obtain a partial measurement beam, the measurement beam splitter being provided in a light path of the measurement beam from the beam splitter to the light synthesizing unit; and a measurement beam detecting sensor that detects a light amount of the partial measurement beam obtained by the measurement beam splitter.

With this arrangement, after the measurement beam is split, a light amount of the obtained partial measurement beam is measured by the measurement beam detecting sensor. Accordingly, as compared with the arrangement such as the reference beam blocking unit for blocking a part of the reference beam, this arrangement can inhibit a decrease in the measurement area and is suitable for a profile measurement of a broader area.

The grazing incidence interferometer according to the above aspect of the invention preferably further includes a light source controlling unit that controls a light amount of the light emitted from the light source based on the light amount of the measurement beam.

When a machining mark or the like is present on the target surface, the light amount of the reflection beam from the measurement beam is significantly changed. Accordingly, even when the ratio between the measurement beam and the reference beam is changed as described above, sufficient interference fringes may not be obtained, so that the measurement accuracy may not be sufficiently improved. In the above arrangement, to cope with this situation, the light amount from the light source can be increased. Moreover, at an excessively large light amount of the measurement beam, when the light receiver receives the synthesized beam of the measurement beam and the reference beam, the received light amount may reach saturation. In the above arrangement, to cope with this situation, the light source controlling unit can decrease the light amount of the light emitted from the light source according to the light amount of the measurement beam. In the aspect of the invention, as described above, the light amount of the measurement beam can be controlled at a high accuracy and the measurement accuracy can be further improved.

The grazing incidence interferometer preferably further includes: a reference-beam amount detection unit that detects a light amount of the reference beam; a variable neutral density filter capable of adjusting the light amount of the reference beam; and a reference beam controlling unit that controls a decrease in the light amount of the reference beam by the variable neutral density filter based on the light amount of the reference beam detected by the reference-beam amount detection unit.

In the above arrangement, the light amount of the reference beam is detected and a neutral density filter that decreases the light amount of the reference beam is controlled based on the detected light amount. In the above arrangement, the light amount of the reference beam can be controlled to a proper value, for instance, when the light amount of the reference beam is extremely larger than the light amount of the measurement beam. For instance, when the light amount of the measurement beam is increased by controlling the light source as described above, since not only the light amount of the measurement beam but also the light amount of the reference beam is increased, the light amount received by the light receiver may reach saturation. In the above arrangement, to cope with this situation, the light amount of the reference beam is decreased, thereby avoiding the light amount received by the light receiver from exceeding saturation.

The grazing incidence interferometer according to the above aspect of the invention preferably further includes: a measurement beam blocking unit that blocks a part of the measurement beam, in which the reference-beam amount detection unit detects a light amount of an area corresponding to the measurement beam blocking unit in a light receiving area of the light receiver.

In the above arrangement, the part of the measurement beam is blocked by the measurement beam blocking unit. With this arrangement, when the light synthesizing unit synthesizes the measurement beam and the reference beam, the measurement beam is not synthesized with the reference beam on the area corresponding to the measurement beam blocking unit, so that only the reference beam is received by the area of the light receiver corresponding to the measurement beam blocking unit. Accordingly, by measuring the light amount on the area, the light amount of the reference beam can be detected with a simple arrangement, for instance, without a separate detecting sensor for detecting the reference beam.

With this arrangement, the reference-beam amount detection unit preferably includes: a reference beam splitter that splits the reference beam to obtain a partial reference beam, the reference beam splitter being provided in a light path of the reference beam from the beam splitter to the light synthesizing unit; and a reference beam detecting sensor that detects a light amount of the partial reference beam obtained by the reference beam splitter.

With this arrangement, after the reference beam is split, a light amount of the obtained partial reference beam is measured by the reference beam detecting sensor. Accordingly, as compared with the arrangement such as the measurement beam blocking unit for blocking the part of the measurement beam, this arrangement can inhibit a decrease in the measurement area.

The grazing incidence interferometer according to the above aspect of the invention preferably further includes: a stage on which a workpiece having the target surface is mounted; and a rotation drive unit that rotates the stage.

In the above aspect of the invention, the profile of the target surface can be continuously measured by mounting the workpiece on the stage and rotating the rotation drive unit. With this arrangement, the profile of a broader area of the target surface can be measured by combining the profiles of the target surface obtained by the continuous measurements.

DESCRIPTION OF EMBODIMENT(S)

First Exemplary Embodiment

A first exemplary embodiment of the invention will be described below with reference to the attached drawings.

Figure 1:
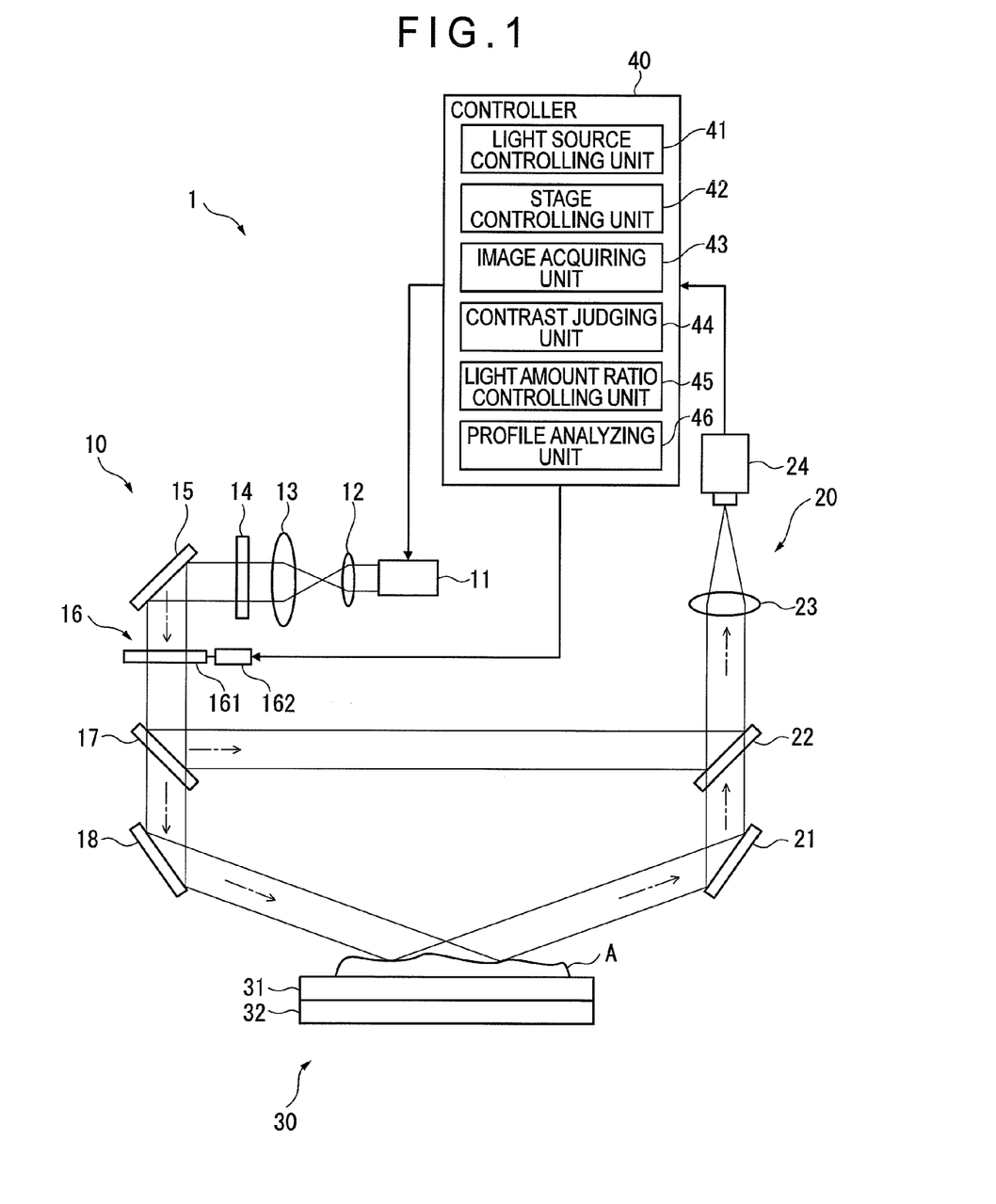
FIG. 1 illustrates a schematic arrangement of a grazing incidence interferometer according to a first exemplary embodiment of the invention.

FIG. 1 illustrates a schematic arrangement of a grazing incidence interferometer according to the first exemplary embodiment of the invention.

A grazing incidence interferometer 1 in the first exemplary embodiment includes a light radiator 10, detector 20, mounting portion 30, and controller 40.

The light radiator 10 includes a light source 11, lenses 12 and 13, a polarizer 14, a first mirror 15, a ratio changer 16, a first polarization beam splitter 17 (beam splitter), and a second mirror 18.

The light source 11 is a laser source and emits coherent light. The light emitted from the light source 11 is converted by the lenses 12 and 13 into parallel beam having a predetermined width to be radiated onto the polarizer 14.

Among the incident light, the polarizer 14 transmits a light in a predetermined first linear polarization direction (e.g., p-polarized light) while blocking a light in a second linear polarization direction (e.g., s-polarized light) orthogonal to the first linear polarization direction. Although the polarizer 14 is exemplarily shown in the first exemplary embodiment, for instance, a polarization conversion element may be used which alters the polarization direction of the incident light in a predetermined first linear polarization direction. In other words, the polarization conversion element transmits the light in the first linear polarization direction while converting the light in the second linear polarization direction into the light in the first linear polarization direction. Alternatively, no polarizer 14 may be provided.

The first mirror 15 reflects the light transmitted through the polarizer 14 toward the ratio changer 16.

The ratio changer 16 includes a $\lambda/2$ plate 161 and a rotation mechanism 162 that rotates the $\lambda/2$ plate 161 around an optical axis. The rotation mechanism 162 is exemplified by a mechanism to rotate the $\lambda/2$ plate 161 only by a predetermined angle in one-step operation. With this arrangement, a rotation amount (rotation angle) of the $\lambda/2$ plate 161 can be controlled with accuracy.

Although the light to be radiated on the $\lambda/2$ plate 161 is converted by the polarizer 14 into the p-polarized light, when the $\lambda/2$ plate 161 is rotated, a polarization plane is rotated according to the rotation amount of the $\lambda/2$ plate 161.

The light transmitted through the $\lambda/2$ plate 161 is radiated on the first polarization beam splitter 17. The first polarization beam splitter 17 splits the incident light into a measurement beam of the p-polarized light and a reference beam of the s-polarized light according to the polarization plane and emits the measurement beam toward the second mirror 18 while emitting the reference beam toward a second polarization beam splitter 22 of the detector 20.

The second mirror 18 is disposed so that the measurement beam is radiated on a target surface of a workpiece A at a predetermined angle to a normal direction of the target surface.

The detector 20 includes a third mirror 21, the second polarization beam splitter 22 (light synthesizing unit), a lens 23, and an image capturing camera 24 (light receiver).

The third mirror 21 reflects the measurement beam reflected on the target surface of the workpiece A toward the second polarization beam splitter 22.

The second polarization beam splitter 22 synthesizes the measurement beam from the third mirror 21 and the reference beam from the first polarization beam splitter 17. The synthesized beam passes through the lens 23 to enter the image capturing camera 24. The image capturing camera 24 captures an image. The captured image (image signal) is input in the controller 40. Note that, for instance, an arrangement disclosed in JP-A-2008-32690 is applicable to the image capturing camera 24.

The mounting portion 30 includes a stage 31 and a rotation drive unit 32.

The stage 31 is a base on which the workpiece A is mounted.

The rotation drive unit 32 is controlled by the controller 40 to rotate the stage 31. The rotation drive unit 32 includes, for instance, a step motor and is exemplarily configured so that the step motor is driven by one step to rotate the stage 31 by a predetermined angle.

Figure 2A:
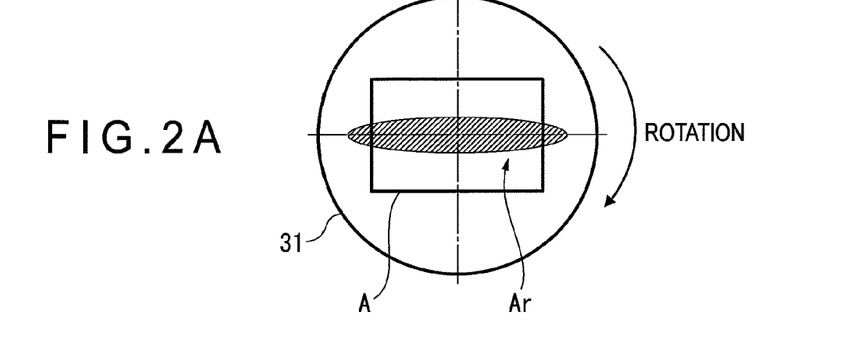
FIG. 2A illustrates a workpiece mounted on a stage and a radiation area of a measurement beam in the first exemplary embodiment.
Figure 2B:
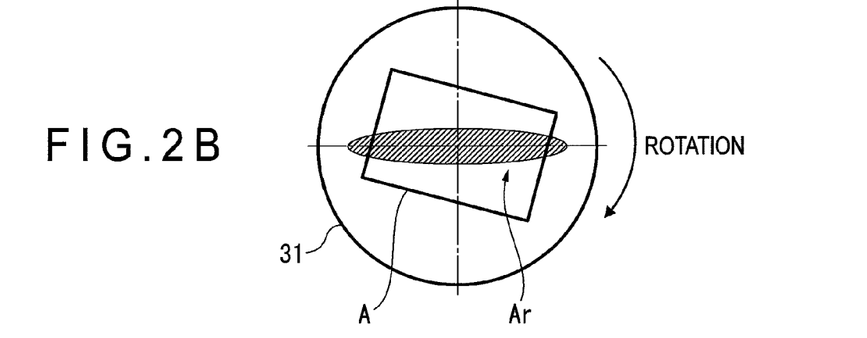
FIG. 2B illustrates the workpiece mounted on the stage and the radiation area of the measurement beam in the first exemplary embodiment.
Figure 2C:
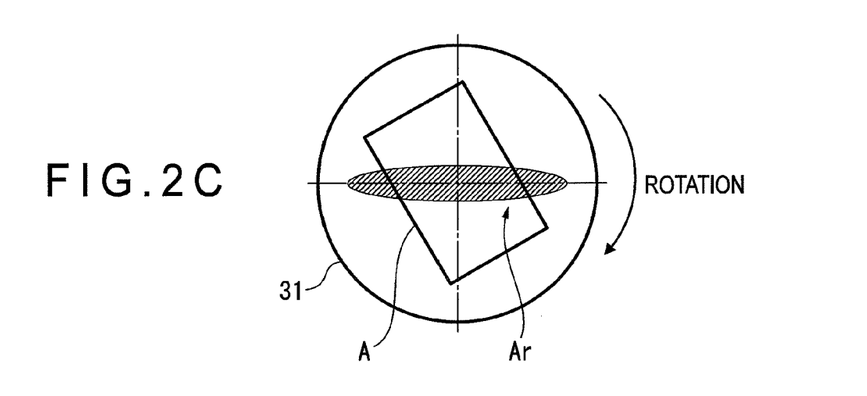
FIG. 2C illustrates the workpiece mounted on the stage and the radiation area of the measurement beam in the first exemplary embodiment.

FIGS. 2A, 2B and 2C each illustrate the workpiece A mounted on the stage and a radiation area Ar of the measurement beam.

As shown in FIGS. 2A, 2B and 2C, in the first exemplary embodiment, the radiation area Ar of the measurement beam on the target surface is shifted by rotating the rotation drive unit 32. In the first exemplary embodiment, the surface profile of a wide area of the target surface can be measured by monitoring the interference fringes on the radiation area Ar while rotating the stage 31 within a measurement plane.

The controller 40 is provided, for instance, by a personal computer and includes: a storage (not shown) including a memory and the like; and a computing unit (not shown) including a CPU and the like. The computing unit retrieves and executes programs from the storage, thereby serving as a light source controlling unit 41, stage controlling unit 42, image acquiring unit 43, contrast judging unit 44, light amount ratio controlling unit 45, profile analyzing unit 46 and the like as shown in FIG. 1.

Herein, the light source controlling unit 41 controls switching ON/OFF the light source 11. The stage controlling unit 42 controls the rotation drive unit 32 of the mounting portion 30 to rotate the stage 31.

The image acquiring unit 43 acquires the image captured by the image capturing camera 24.

The contrast judging unit 44 judges contrast of the acquired captured-image and judges whether the light amount of the measurement beam is equal to or less than a predetermined threshold value with reference to a reference value. Note that the reference value is appropriately set based on an allowable error in the measurement of the interference fringes.

The light amount ratio controlling unit 45 controls the rotation mechanism 162 of the ratio changer 16 based on the judgment result by the contrast judging unit 44 to rotate the $\lambda/2$ plate 161, thereby rotating the polarization plane of the light transmitted through the $\lambda/2$ plate 161, so that a light amount ratio (light intensity ratio) of the measurement beam and the reference beam into which the first polarization beam splitter 17 splits the light is changed.

The profile analyzing unit 46 analyzes the surface profile of the target surface by analyzing the interference fringes of the captured image, for instance, by a phase shift method.

Surface Profile Measurement Method by Grazing Incidence Interferometer

Next, a profile measurement method of the target surface of the workpiece A using the aforementioned grazing incidence interferometer 1 will be described with reference to the drawings.

Figure 3:
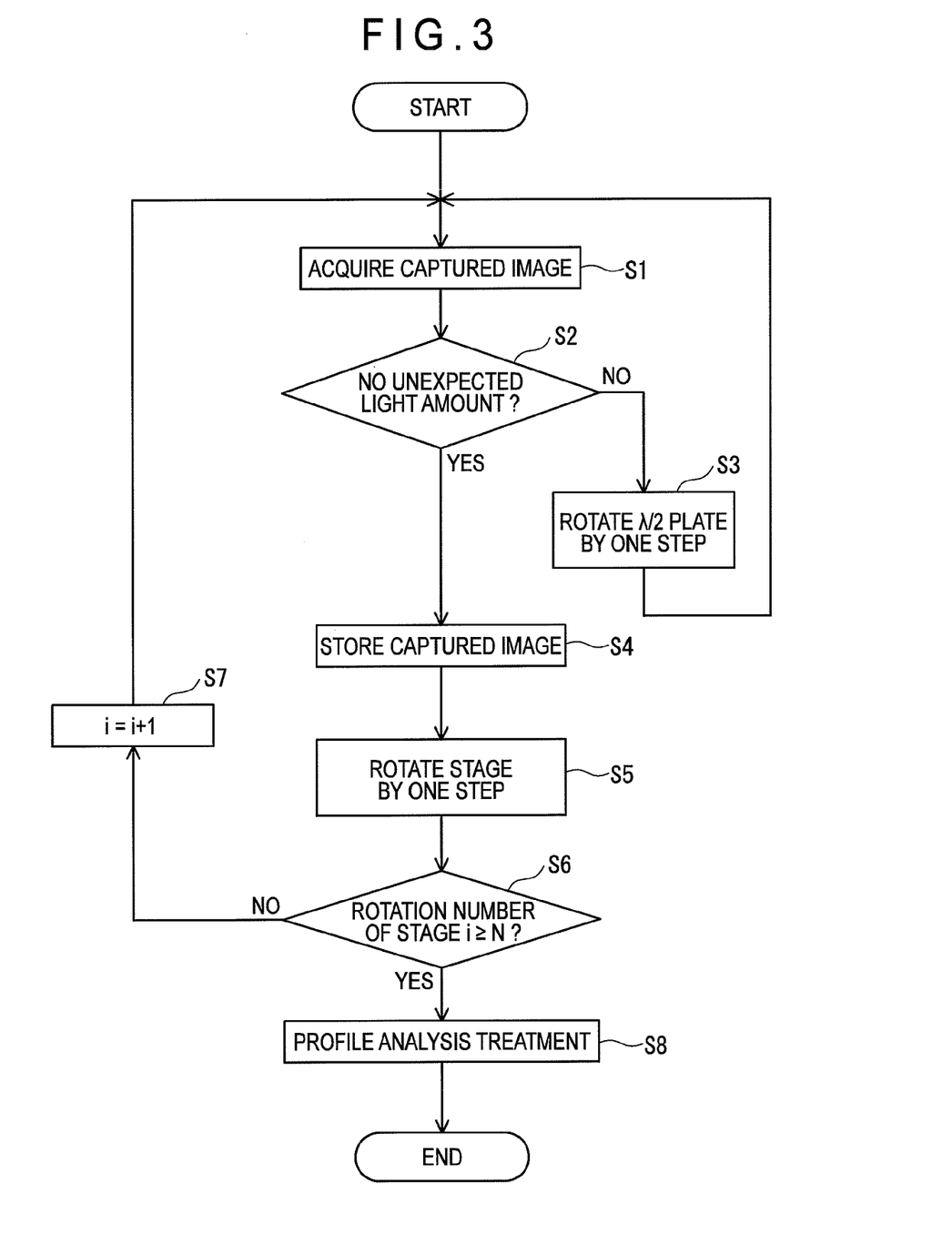
FIG. 3 is a flowchart showing a profile measurement method in the first exemplary embodiment.

FIG. 3 is a flowchart showing a profile measurement method using the grazing incidence interferometer 1 in the first exemplary embodiment.

In the grazing incidence interferometer 1 in the first exemplary embodiment, when the measurement is started after the workpiece A is mounted on the mounting portion 30, the light source controlling unit 41 controls the light source 11 to be switched ON and emit coherent light. In response to this light emission, a synthesized beam of the measurement beam reflected on the target surface of the workpiece A and the reference beam is received by the image capturing camera 24 and the image acquiring unit 43 acquires the captured image (Step S1).

Next, the contrast judging unit 44 judges whether the light amount is unexpected or not based on the captured image (Step S2). In the first exemplary embodiment, Step S2 is conducted by the contrast judging unit 44. Specifically, the contrast judging unit 44 analyzes a sine wave function of the interference fringes generated by interference of the measurement beam and the reference beam and judges whether the analyzed sine wave function is appropriate or not (in other words, whether or not there is contrast enough to keep a measurement accuracy from being affected).

In other words, when a plurality of pixels having the maximum luminance are adjacent to each other in the interference fringes of the captured image, since the light amount received by the pixels exceeds saturation, the interference fringes cannot be accurately measured, thereby lowering the accuracy of the profile measurement. On the other hand, even if the sine wave of the interference fringes is analyzed, when the luminance is insufficient, the accuracy of the profile measurement is lowered due to a shortage of the light amount. Accordingly, the contrast judging unit 44 judges whether or not an amplitude of the analyzed sine wave is equal to or exceeds a predetermined level and the luminance of the pixels is less than the maximum luminance corresponding to the received light amount for saturation.

When the judgment is made as No in Step S2, the light amount ratio controlling unit 45 rotates the $\lambda/2$ plate 161 by a predetermined angle (Step S3). Specifically, the light amount ratio controlling unit 45 drives the step motor of the rotation mechanism by one step to rotate the $\lambda/2$ plate 161 by the rotation amount corresponding to one step. By this operation, the polarization plane of the light transmitted through the $\lambda/2$ plate 161 is rotated, so that the light amount ratio of the measurement beam and the reference beam into which the first polarization beam splitter 17 is changed.

After this operation, the procedure is returned to Step S1.

On the other hand, when the judgment is made as Yes in Step S2, the image acquiring unit 43 stores the acquired image (Step S4).

Subsequently, the stage controlling unit 42 drives the step motor of the rotation drive unit 32 by one step, thereby rotating the stage 31 (Step S5). After this operation, it is judged whether a variable i representing a rotation number of the stage 31 is equal to or more than N (Step S6), in which the variable i is in a range of 1 to N and an initial value is set at 1, and the stage 31 is to be rotated by 360 degrees at i=N+1.

When the judgment is made as No in Step S6, 1 is added to the variable i (Step S7), so that the procedure is returned to Step S1. On the other hand, when the judgment is made as Yes in Step S6, the profile analyzing unit 46 analyzes the interference fringes by the phase shift method to obtain a profile of the target surface (Step S8). In the first exemplary embodiment, since the images are captured every time the rotation drive unit 32 rotates the stage 31 by one step, the profile of a broader area of the target surface can be measured by combining measurement results of the surface profiles obtained by analyzing the captured images.

Advantage(s) of First Exemplary Embodiment

In the grazing incidence interferometer 1 in the first exemplary embodiment, the $\lambda/2$ plate 161 to be rotatable by the rotation mechanism 162 is provided to the light radiator 10. In this arrangement, by rotating of the $\lambda/2$ plate 161 by a predetermined amount, the polarization plane of the light transmitted through the $\lambda/2$ plate 161 is rotated. Consequently, the ratio in the light amount between the measurement beam and the reference beam into which the first polarization beam splitter 17 splits the light is also changed.

Accordingly, even when a machining mark or the like is present on the target surface of the workpiece A to cause an unexpected light amount of the measurement beam reflected on the target surface, since the light amount ratio between the measurement beam and the reference beam can be adjusted, a decrease in the measurement accuracy caused by the unexpected light amount of the measurement beam can be inhibited, so that a highly accurate profile measurement can be conducted.

In the first exemplary embodiment, the ratio changer 16 includes the rotatable $\lambda/2$ plate 161.

In this arrangement, the polarization plane of the coherent light is rotatable by the $\lambda/2$ plate 161. Accordingly, when the first polarization beam splitter 17 is used as a beam splitter of the invention, the light amount ratio between the measurement beam and the reference beam is easily changeable with a simple arrangement.

When the light amount ratio controlling unit 45 rotates the $\lambda/2$ plate 161 by every predetermined amount and the contrast judging unit 44 judges that the amplitude in the sine wave function of the interference fringes falls within a predetermined range, the grazing incidence interferometer 1 in the first exemplary embodiment stores the acquired captured-image and measures the profiles of the target surface based on the interference fringes of the captured image. In other words, in the first exemplary embodiment, the contrast judging unit 44 is a measurement-beam amount detection unit of the invention and the $\lambda/2$ plate 161 is controlled by the light amount ratio controlling unit 45.

In this arrangement, it can be judged based on the acquired image whether or not the light amount of the measurement beam is appropriate and does not affect the measurement accuracy. Accordingly, for instance, a light sensor for detecting the light amount of the measurement beam is not separately required, so that a highly accurate profile measurement can be conducted with a simple arrangement.

Second Exemplary Embodiment

A second exemplary embodiment of the invention will be described below with reference to the attached drawings.

In the first exemplary embodiment, it is judged based on the contrast of the interference fringes of the acquired captured-image whether the light amount of the measurement beam is appropriate or not. However, no interference fringes occasionally appear on the captured image (so-called Null condition), where the contrast of the interference fringes cannot be judged with a high accuracy. To cope with this situation, unlike in the first exemplary embodiment, it can be judged even in such a Null condition in the second exemplary embodiment whether or not the light amount of the measurement beam is appropriate.

Figure 4:
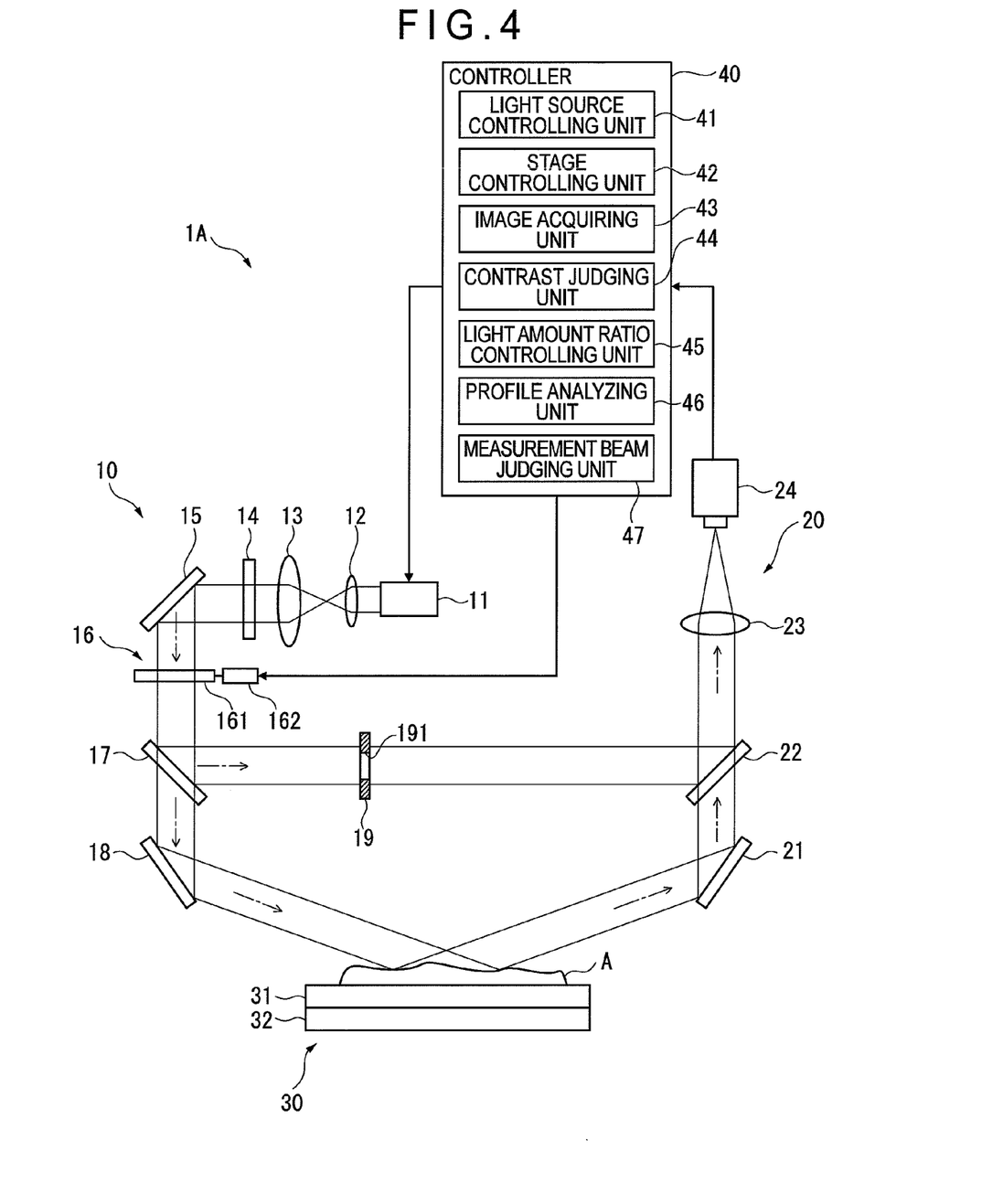
FIG. 4 illustrates a schematic arrangement of a grazing incidence interferometer according to a second exemplary embodiment of the invention.
Figure 5:
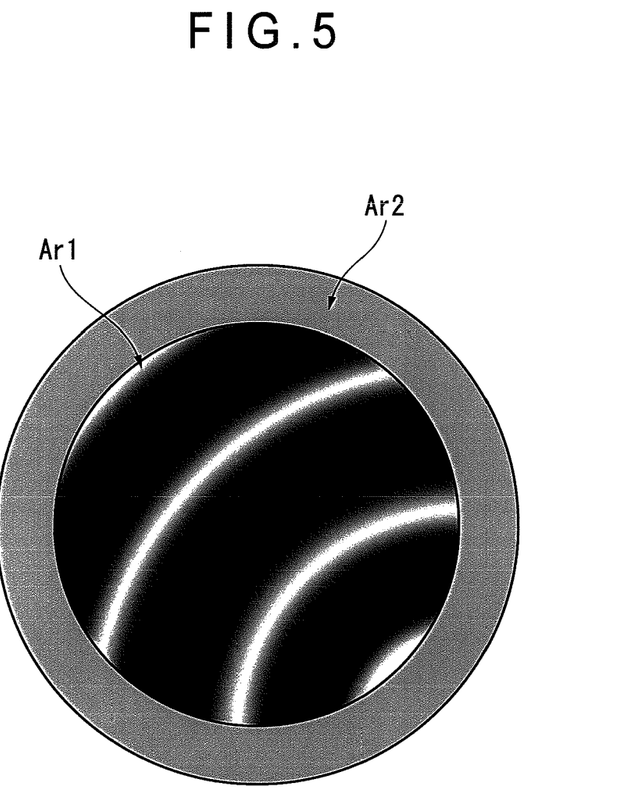
FIG. 5 illustrates an example of a captured image in the second exemplary embodiment.

FIG. 4 illustrates a schematic arrangement of a grazing incidence interferometer according to the second exemplary embodiment. FIG. 5 illustrates an example of a captured image in the grazing incidence interferometer in the second exemplary embodiment. Note that, in the following descriptions of the arrangements, the same arrangement as described above is denoted by the same numerical reference and the description of the arrangement will be omitted or simplified.

As shown in FIG. 4, the grazing incidence interferometer 1 in the second exemplary embodiment includes an aperture member 19 that is provided in a light path of the reference beam and narrows a beam diameter of the reference beam.

The aperture member 19 is provided by a light-blocking member and includes an aperture 191 having an optical axis coaxial with a main optical axis of the reference beam and having an aperture size smaller than the beam diameter of the reference beam.

Accordingly, in the second exemplary embodiment, the reference beam after passing through the aperture 191 of the aperture member 19 and the measurement beam are to be synthesized. In this arrangement, the interference fringes of the reference beam and the measurement beam appear at the center (interference fringe measurement area Ar1) of the image captured by the image capturing camera 24 of the detector 20, as shown in FIG. 5. Moreover, since the reference beam is not radiated onto an outside (measurement beam area Ar2) of the interference fringe measurement area Ar1, only an image of the measurement beam is captured.

In the second exemplary embodiment, the controller 40 includes a measurement beam judging unit 47 as shown in FIG. 4. The measurement beam judging unit 47 judges based on the light amount on the measurement beam area Ar2 whether or not the light amount of the measurement beam is appropriate or falls within a predetermined range. Specifically, the measurement beam judging unit 47 judges whether or not the light amount of the measurement beam does not exceed the received light amount for saturation but is equal to or more than a light amount not to affect the measurement accuracy.

Surface Profile Measurement Method in Second Exemplary Embodiment

In the second exemplary embodiment, in the processing of Step S2 of the first exemplary embodiment, the measurement beam judging unit 47 detects the light amount of the measurement beam on the measurement beam area Ar2 and judges whether or not the light amount of the measurement beam falls within a predetermined range. In other words, in the second exemplary embodiment, the image acquiring unit 43 and the measurement beam judging unit 47 defines the measurement-beam amount detection unit of the invention to detect the light amount of the measurement beam on the measurement beam area Ar2. When the light amount of the measurement beam is out of the predetermined range, the procedure proceeds to Step S3. When the light amount of the measurement beam falls within the predetermined range, the procedure proceeds to Step S4.

When the interference fringes are in the Null condition as described above, it is difficult to judge the contrast of the interference fringes. To cope with this situation, since the light amount of the measurement beam is judged based on the light amount on the measurement beam area Ar2 in the second exemplary embodiment, it can be judged even in the Null condition whether or not the light amount of the measurement beam is appropriate.

It should be noted that, as in the first exemplary embodiment, the contrast of the interference fringes may be judged in Step S2, and the measurement beam judging unit 47 may judge the light amount on the measurement beam area Ar2 when the contrast of the interference fringes cannot be judged.

Moreover, in the second exemplary embodiment, the processing of Step S1 may be conducted when the judgment is made as Yes in Step S2.

Advantage(s) of Second Exemplary Embodiment

The grazing incidence interferometer 1A in the second exemplary embodiment includes the aperture member 19 that blocks a part of the reference beam. The measurement beam judging unit 47 judges whether or not the light amount on the measurement beam area Ar2 where the part of the reference beam is blocked by the aperture member 19 is appropriate.

Accordingly, in the second exemplary embodiment, even in the Null condition where no interference fringes are generated on the interference fringe measurement area Ar1 of the captured image, it can be judged based on the light amount on the measurement beam area Ar2 whether the light amount of the measurement beam is appropriate or not. Moreover, a light sensor for detecting the light amount of the measurement beam is not separately required, so that the arrangement can be simplified.

Third Exemplary Embodiment

Next, a third exemplary embodiment of the invention will be described below with reference to the attached drawings.

In the second exemplary embodiment, a part of the reference beam is blocked by the aperture member 19 and the light amount of the measurement beam is detected on the measurement beam area Ar2 corresponding to the area where the part of the reference beam is blocked. In this arrangement, since a part of the reference beam is blocked, the interference fringe measurement area Ar1 where the reference beam and the measurement beam are synthesized becomes small. In contrast, the third exemplary embodiment is different from the second exemplary embodiment in that the light amount of the measurement beam is detected without reducing an area of the interference fringe measurement area Ar1.

Figure 6:
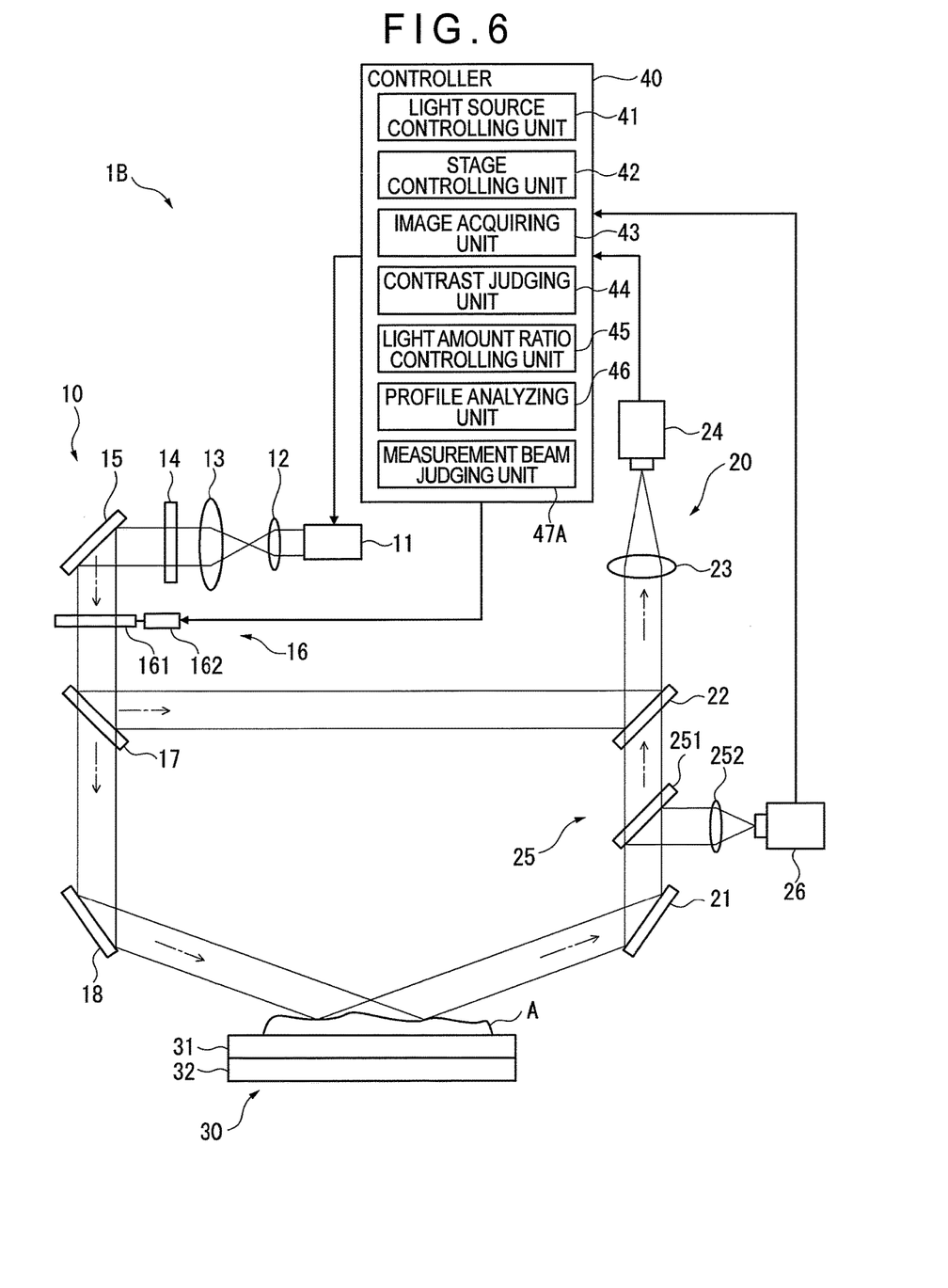
FIG. 6 illustrates a schematic arrangement of a grazing incidence interferometer according to a third exemplary embodiment of the invention.

FIG. 6 illustrates a schematic arrangement of a grazing incidence interferometer in the third exemplary embodiment.

As shown in FIG. 6, a grazing incidence interferometer 1B in the third exemplary embodiment includes a measurement beam splitter 25 and a measurement beam detecting sensor 26 in the light path of the measurement beam. In the third exemplary embodiment, the measurement beam splitter 25 and the measurement beam detecting sensor 26 define the measurement-beam amount detection unit of the invention.

The measurement beam splitter 25 includes: a half mirror 251 provided between the third mirror 21 and the second polarization beam splitter 22; and a condenser lens 252. The half mirror 251 reflects a part of the measurement beam reflected by the third mirror 21 toward the condenser lens 252 and transmits the rest of the measurement beam toward the second polarization beam splitter 22. The light reflected by the half mirror 251 is collected by the condenser lens 252 and is received by the measurement beam detecting sensor 26.

The controller 40 in the third exemplary embodiment includes a measurement beam judging unit 47A. In the second exemplary embodiment, at Step S2, the measurement beam judging unit 47 detects the light amount of the measurement beam based on the measurement beam area Ar2 of the captured image acquired by the image acquiring unit 43. However, in the third exemplary embodiment, at Step S2, the measurement beam detecting sensor 26 directly detects (measures) the light amount of the measurement beam and the measurement beam judging unit 47A acquires the light amount of the measurement beam based on a signal value input by the measurement beam detecting sensor 26.

In the third exemplary embodiment, the measurement beam splitter 25 is provided between the third mirror 21 and the second polarization beam splitter 22. However, the measurement beam splitter 25 may be provided in the light path of the measurement beam between the mounting portion 30 and the third mirror 21.

Advantage(s) of Third Exemplary Embodiment

In the third exemplary embodiment, the reference beam is not blocked. Accordingly, the area of the interference fringe measurement area Ar1 where the measurement beam and the reference beam are synthesized is not reduced. Consequently, in the third exemplary embodiment, an unexpected light amount of the measurement beam can be detected with a high accuracy while the measurement area as large as that in the first exemplary embodiment is kept and the interference fringes are detectable even in the Null condition as in the second exemplary embodiment.

Fourth Exemplary Embodiment

Next, a fourth exemplary embodiment of the invention will be described below with reference to the attached drawings.

In the first to third exemplary embodiments, it is judged based on the contrast of the interference fringes or the light amount of the measurement beam whether or not an appropriate profile measurement can be conducted. However, it is also conceived that the light amount of the measurement beam is further reduced depending on a condition, a direction and the like of the machining mark on the target surface. To cope with this situation, different from in the first to third exemplary embodiments, a shortage of the light amount of the measurement beam as described above is dealt with by controlling the light amount of the light emitted from the light source 11 in the fourth exemplary embodiment.

Figure 7:
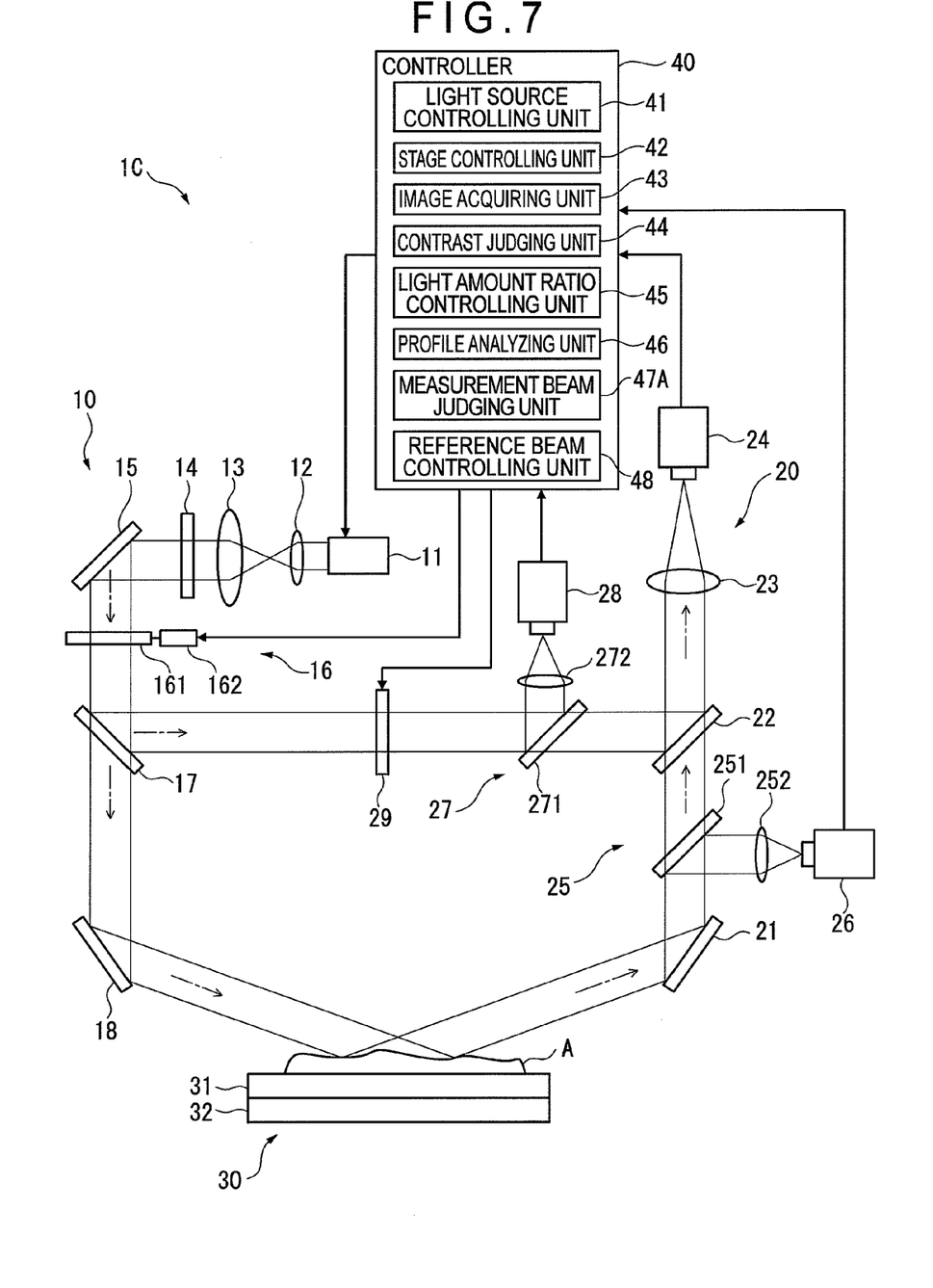
FIG. 7 illustrates a schematic arrangement of a grazing incidence interferometer according to a fourth exemplary embodiment of the invention.

FIG. 7 illustrates a schematic arrangement of a grazing incidence interferometer according to the fourth exemplary embodiment.

As shown in FIG. 7, a grazing incidence interferometer 1C in the fourth exemplary embodiment includes the measurement beam splitter 25 and the measurement beam detecting sensor 26 in the light path of the measurement beam in the same manner as in the third exemplary embodiment.

The grazing incidence interferometer 1C in the fourth exemplary embodiment further includes a reference beam splitter 27 and a reference beam detecting sensor 28 in the light path of the measurement beam. In other words, in the fourth exemplary embodiment, the reference beam splitter 27 and the reference beam detecting sensor 28 define reference-beam amount detection unit of the invention.

The reference beam splitter 27 includes, for instance, a half mirror 271 and a condenser lens 272. The half mirror 271, which is provided in the light path of the reference beam that is split at the first polarization beam splitter 17, reflects a part of the reference beam toward the condenser lens 272 and transmits the rest of the reference beam toward the second polarization beam splitter 22. The light reflected by the half mirror 271 is collected by the condenser lens 272 and is received by the reference beam detecting sensor 28.

Moreover, a neutral density filter 29 (variable neutral density filter) is provided in the light path of the reference beam. The neutral density filter 29 is controlled by the controller to adjust a transmitted light amount of the reference beam.

The controller 40 in the fourth exemplary embodiment includes a reference beam controlling unit 48 that detects the light amount of the reference beam based on a detection signal from the reference beam detecting sensor 28. The reference beam controlling unit 48 controls the neutral density filter 29 depending on the detected light amount of the reference beam.

Moreover, the light source 11 in the fourth exemplary embodiment is configured so that the light amount of the light emitted from the light source 11 is adjustable at any intensity. The light source controlling unit 41 not only controls switching ON/OFF the light source 11 but also can control the light amount of the light source 11 when the light source 11 is switched ON.

Profile Measurement Method in Fourth Exemplary Embodiment

Figure 8:
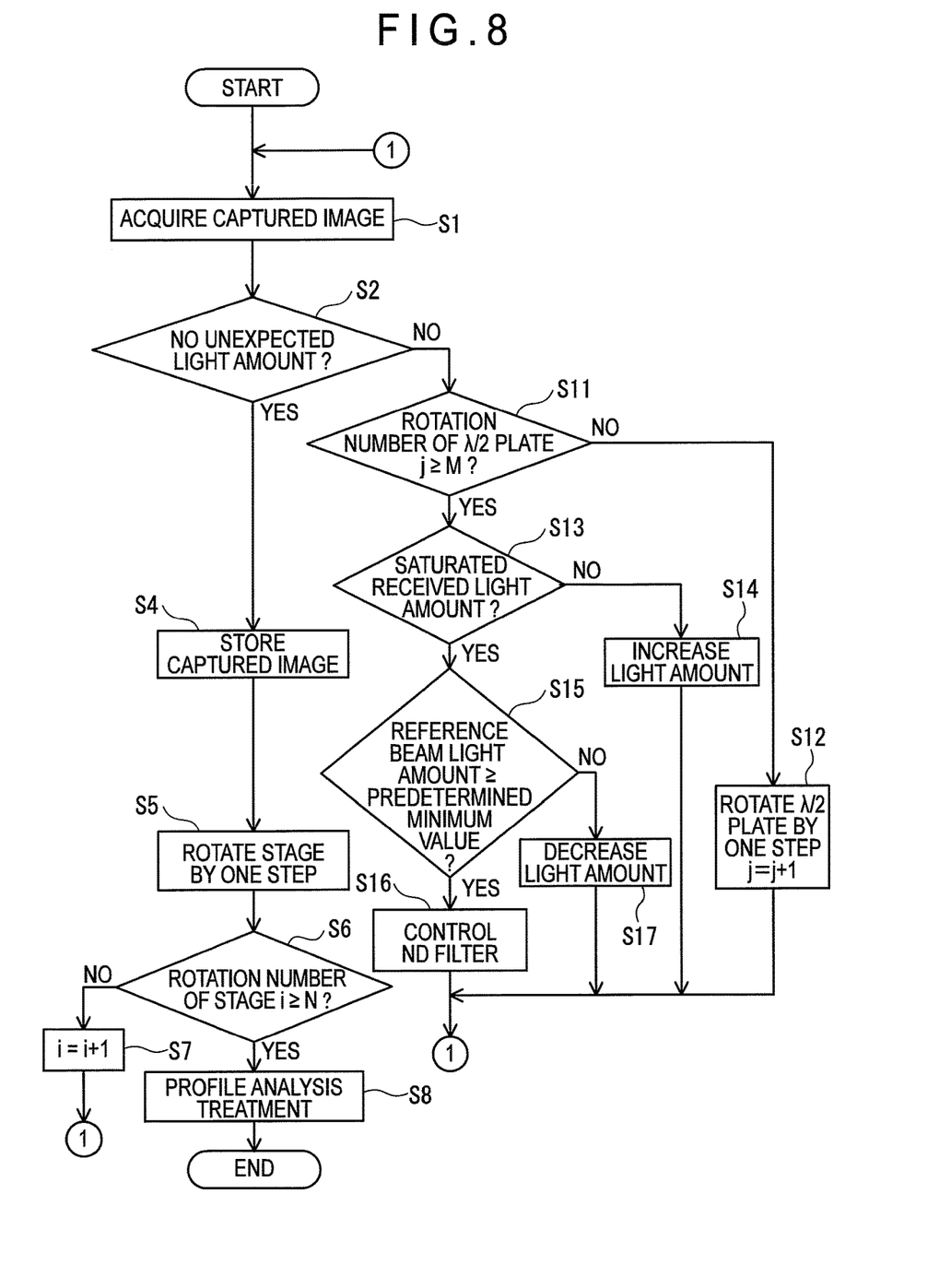
FIG. 8 is a flowchart showing a profile measurement method in the fourth exemplary embodiment.

FIG. 8 is a flowchart showing a profile measurement method in the fourth exemplary embodiment.

As shown in FIG. 8, it is judged whether the light amount is unexpected or not in the fourth exemplary embodiment, in the processing of Step S2 as in the first to third exemplary embodiments.

When the judgment is made as No at Step S2, it is judged whether a variable j representing a rotation number of the λ/2 plate 161 is equal to or more than the maximum value M (Step S11), in which the variable j is in a range of 1 to M and an initial value of j is set at 1, and the λ/2 plate 161 is to be rotated by 180 degrees at j=M+1.

When the judgment is made as No in Step S11, the λ/2 plate 161 is rotated by one step in the same manner as in Step S3 (Step S12). At this time, the light amount ratio controlling unit 45 adds 1 to the variable j. After this operation, the procedure is returned to Step S1.

On the other hand, when the judgment is made as Yes in Step S11, the judgment means that contrast of the interference fringes that allows a sufficient accuracy in the measurement is not obtained even by rotating the λ/2 plate 161 by 180 degrees.

In this case, the light source controlling unit 41 judges whether or not an the unexpected light amount is caused due to the presence of the pixel having a luminance value that is the maximum luminance value (luminance value corresponding to the received light amount for saturation) in the acquired captured-image (Step S13).

When the judgment is made as No in Step S13, since a shortage of the light amount is conceivable, the light source controlling unit 41 increases the light amount of the light emitted from the light source 11 (Step S14). After this operation, the procedure is returned to Step S1.

When the judgment is made as Yes in Step S13, it is conceived that at least one pixel of the image captured by the image capturing camera 24 reaches the received light amount for saturation. In this case, the reference beam controlling unit 48 detects the light amount of the reference beam detected by the reference beam detecting sensor 28 and judges whether or not the light amount is equal to or more than a predetermined minimum value (Step S15).

When the judgment is made as Yes in Step S15, since the light amount of the reference beam is large, the reference beam controlling unit 48 controls the neutral density filter 29 to decrease the light amount of the reference beam in view of the signal from the reference beam detecting sensor 28 (Step S16). Subsequently, the procedure is returned to Step S1.

When the judgment is made as No in Step S15, the light source controlling unit 41 controls the light source 11 to decrease the light amount of the light to be emitted from the light source 11 (Step S17). Subsequently, the procedure is returned to Step S1.

Advantage(s) of Fourth Exemplary Embodiment

In the fourth exemplary embodiment, the light amount of the light to be emitted from the light source 11 is adjustable. When it is judged that the light amount of the captured image is unexpected and the light amount is insufficient, the light amount of the measurement beam is increased. Accordingly, even when the reflection beam of the measurement beam is decreased by the machining mark and the like, an increase in the light amount from the light source 11 inhibits a decrease in the contrast of the interference fringes due to a shortage of the light amount and also inhibits a decrease in the measurement accuracy due to the decrease in the contrast.

In the fourth exemplary embodiment, the reference beam detecting sensor 28 for detecting the reference beam is provided in the light path of the reference beam, and further, the neutral density filter 29 for adjusting the light amount of the reference beam is provided.

As described above, when the light amount is increased by controlling the light amount from the light source 11, not only the light amount of the measurement beam but also the light amount of the reference beam is increased In this case, since the light amount of the reference beam is increased, the light amount received by the image capturing camera 24 may reach saturation. To cope with this situation, since the neutral density filter 29 is controlled based on the light amount of the reference beam detected by the reference beam detecting sensor 28 in the fourth exemplary embodiment, an increase in the light amount of the reference beam can be inhibited. With this operation, a decrease in the measurement accuracy can be inhibited.

Modification(s)

It should be understood that the scope of the invention is not limited to the above-described exemplary embodiments but includes modifications and improvements as long as the modifications and improvements are compatible with the invention.

Although the measurement beam detecting sensor 26 is used for detecting the light amount of the measurement beam in the fourth exemplary embodiment, for instance, the aperture member 19 may be provided in the light path of the reference beam as described in the second exemplary embodiment, whereby the light amount of the measurement beam may be detected based on the light amount of each of the pixels corresponding to the part blocked by the aperture member 19 (the measurement beam area) in the synthesized beam obtained by synthesizing the reference beam and the measurement beam. Alternatively, it may be judged whether the light amount is unexpected or not based on the contrast of the interference fringes as in the first exemplary embodiment.

The same applies to the reference beam. For instance, an aperture member configured in the same manner as the aperture member 19 may be provided as a measurement beam blocking unit in the light path of the measurement beam to detect the light amount of each of the pixels corresponding to the reference beam area where the aperture member is provided. In this case, the image acquiring unit 43 and the reference beam controlling unit 48 provides the reference-beam amount detection unit of the invention.

Moreover, in the arrangement where the aperture member serving as the reference beam blocking unit is provided in the light path of the reference beam and the aperture member serving as the measurement beam blocking unit is provided in the light path of the measurement beam, the area blocked by the reference beam blocking unit is preferably different from the area blocked by measurement beam blocking unit. For instance, the reference beam blocking unit may be provided by a ring-shaped first reference beam blocking unit having a smaller aperture diameter than that of the measurement beam blocking unit and a second reference beam blocking unit having a larger aperture diameter than an outer circumferential edge of the first reference beam blocking unit. The aperture diameter of the measurement beam blocking unit is the same as the diameter of the outer circumferential edge of the first reference beam blocking unit. With this arrangement, the central part of the captured image is defined as the interference fringe measurement area on which the interference fringes appear, the outside of the interference fringe measurement area is defined as an annular measurement beam area on which only the measurement beam is radiated, and the outside of the measurement beam area is defined as an annular reference beam area on which only the reference beam is radiated. Accordingly, by measuring the light amounts of the interference fringe measurement area, the measurement beam area and the reference beam area, the profile measurement using the phase shift method, the measurement-beam-amount measurement and the reference-beam-amount measurement can be conducted. The measurement beam blocking unit and the reference beam blocking unit may be movable out of the light path. In this arrangement, aperture members having the same aperture diameter may be used as the respective measurement beam blocking unit and reference beam blocking unit. While the measurement beam blocking unit is positioned in the light path of the measurement beam, the interference fringe measurement area and the reference beam measurement area appear on the captured image. While the reference beam blocking unit is positioned in the light path of the reference beam, the interference fringe measurement area and the measurement beam area appear on the captured image. By moving both of the measurement beam blocking unit and the reference beam blocking unit out of the light path, the area of the interference fringe measurement area in the captured image can be expanded.

Although a reference beam blocking member is exemplified by the aperture member 19, the reference beam blocking member is not limited thereto. For instance, a light blocking member that blocks the reference beam so that an image to be captured of the reference beam is partially cut out may be used. Even in this light blocking member, since the reference beam is blocked and only the measurement beam enters the image capturing camera 24 through the light blocked part, only the light amount of the measurement beam can be detected in the same manner as in the second exemplary embodiment. The same applies to a measurement beam blocking member.

In the fourth exemplary embodiment, the measurement beam splitter 25, measurement beam detecting sensor 26, reference beam splitter 27, and reference beam detecting sensor 28 are used. However, the arrangement for detecting the measurement beam and the reference beam is not limited thereto. For instance, the measurement beam may be detected by the measurement beam splitter 25 and the measurement beam detecting sensor 26 and the reference beam may be detected by the aforementioned measurement beam blocking unit.

Alternatively, the reference beam may be detected by the reference beam splitter 27 and the reference beam detecting sensor 28 while the measurement beam may be detected by the reference beam blocking unit as in the second exemplary embodiment. In this arrangement, since the measurement beam is not split by the measurement beam splitter 25, the decrease in the light amount of the measurement beam can be further inhibited.

In the above exemplary embodiments, the stage 31 on which the workpiece A is mounted is rotatable by the rotation drive unit 32. However, the stage 31 may be unrotatable.

Alternatively, the stage 31 may be moved in one direction. In this arrangement, the workpiece A is moved in a linear direction, thereby continuously acquiring the captured images. A measurement result over a broad area can be obtained by combining the captured images.

In the above exemplary embodiments, the ratio changer 16 includes the λ/2 plate 161 and the rotation mechanism 162 that rotates the ?12 plate 161 and the ratio changer 16 is provided between the first mirror 15 and the first polarization beam splitter 17. However, the position of the ratio changer 16 is not particularly limited as long as the ratio changer 16 precedes the first polarization beam splitter 17. For instance, the ratio changer 16 may be provided between the polarizer 14 and the first mirror 15.

Although the ratio changer 16 is exemplarily provided by the λ/2 plate 161 and the rotation mechanism 162, the ratio changer 16 is not limited thereto. The light amount ratio between the reference beam and the measurement beam may be changed, for instance, by splitting the laser light emitted from the light source 11 into two beams, rotating polarization planes of the respective beams, and again overlapping the polarization planes.

Other specific arrangements of the invention may be altered in any manner as long as an object of the invention is achievable.

What is claimed is:

1. A grazing incidence interferometer configured to measure a profile of a target surface using a measurement beam radiated on the target surface in a direction oblique to a normal line of the target surface and reflected on the target surface to cause an interference with a reference beam, the grazing incidence interferometer comprising:
    a light source that is configured to emit light;
    a beam splitter that is configured to split the light from the light source into the reference beam and the measurement beam;
    a λ/2 plate provided between the light source and the beam splitter and configured to change a light amount ratio between the reference beam and the measurement beam to any ratio;
    a light synthesizer that is configured to synthesize the reference beam and the measurement beam reflected on the target surface;
    a camera that is configured to capture an image of a synthesized beam of the reference beam and the measurement beam; and
    a controller comprising:
        a storage configured to store a program therein;
        a processor configured to read the program stored in the storage and perform a processing;
        a contrast judging unit configured to analyze a sine wave function of interference fringes from the image of the synthesized beam captured by the camera to detect a maximum value of an amplitude of the sine wave function to judge whether the maximum value of the amplitude is at or more than a preset predetermined level and less than a light amount received for saturation, and
        a light ratio controller configured to control the λ/2 plate so that the maximum value of the amplitude is equal to or exceeds the predetermined level, and less than the light amount received for saturation.

2. The grazing incidence interferometer according to claim 1, wherein
    the beam splitter is configured to split the light from the light source into the reference beam with a first linear polarization direction and the measurement beam with a second linear polarization direction orthogonal to the first linear polarization direction.

3. The grazing incidence interferometer according to claim 1, wherein the controller further comprises a light source controller that is configured to control a light amount of the light emitted from the light source based on the light amount of the measurement beam.

4. The grazing incidence interferometer according to claim 1, further comprising:
    a variable neutral density filter configured to adjust the light amount of the reference beam; and
    a measurement beam blocker that is configured to block a part of the measurement beam, wherein the controller comprises:
        a reference-beam amount detector configured to detect a light amount of an area corresponding to the measurement beam blocker in a light receiving area of the image captured by the camera as a light amount of the reference beam; and
        a reference beam controlling unit configured to control a decrease in the light amount of the reference beam by the variable neutral density filter based on the light amount of the reference beam detected by the reference-beam amount detector.

5. The grazing incidence interferometer according to claim 1, further comprising:
    a variable neutral density filter configured to adjust the light amount of the reference beam;
    a reference beam splitter that is configured to split the reference beam to obtain a partial reference beam, the reference beam splitter being provided in a light path of the reference beam from the beam splitter to the light synthesizer; and
    a reference beam detecting sensor that is configured to detect a light amount of the partial reference beam obtained by the reference beam splitter, wherein
    the controller comprises a reference beam controlling unit configured to control a decrease in the light amount of the reference beam by the variable neutral density filter based on the light amount of the reference beam detected by the reference beam detecting sensor.

6. The grazing incidence interferometer according to claim 1, further comprising:
a stage on which a workpiece having the target surface is mounted; and
a rotation driver that is configured to rotate the stage.

7. The grazing incidence interferometer according to claim 1,
wherein the controller is configured to determine a difference in a light amount of the measurement beam with respect to a predetermined threshold value of the measurement beam, and
the λ/2 plate is further configured to change the light amount ratio based on the determined difference.

8. The grazing incidence interferometer according to claim 1, wherein the λ/2 plate is further configured to be rotatable around a main optical axis of the light from the light source.

9. The grazing incidence interferometer according to claim 8, wherein the λ/2 plate is further configured to change the light amount ratio to any ratio between the reference beam and the measurement beam split by the beam splitter when the λ/2 plate is rotated.

10. The grazing incidence interferometer according to claim 1, wherein the beam splitter is a polarization beam splitter that is configured to split the light into the reference beam and the measurement beam respectively with different polarization directions.

11. A grazing incidence interferometer configured to measure a profile of a target surface using a measurement beam radiated on the target surface in a direction oblique to a normal line of the target surface and reflected on the target surface to cause an interference with a reference beam, the grazing incidence interferometer comprising:
a light source that is configured to emit light;
a beam splitter that is configured to split the light from the light source into the reference beam and the measurement beam;
a λ/2 plate provided between the light source and the beam splitter and configured to change a light amount ratio between the reference beam and the measurement beam to any ratio;
a reference beam blocker configured to block a part of the reference beam;
a light synthesizer that is configured to synthesize the reference beam and the measurement beam reflected on the target surface;
a camera that is configured to capture an image of a synthesized beam of the reference beam and the measurement beam; and
a controller comprising:
a storage configured to store a program therein;
a processor configured to read the program stored in the storage and perform a processing;
a measurement beam judging unit configured to detect whether or not a light amount of an area where the reference beam is blocked by the reference beam blocker in the image of the synthesized beam captured by the camera falls within a predetermined range, and
a light ratio controller configured to control the λ/2 plate so that the light amount of the area where the reference beam is blocked by the reference beam blocker does not exceed a light amount received for saturation and is equal to or exceeds a predetermined amount not to affect a measurement accuracy.

12. A grazing incidence interferometer configured to measure a profile of a target surface using a measurement beam radiated on the target surface in a direction oblique to a normal line of the target surface and reflected on the target surface to cause an interference with a reference beam, the grazing incidence interferometer comprising:
a light source that is configured to emit light;
a beam splitter that is configured to split the light from the light source into the reference beam and the measurement beam;
a λ/2 plate provided between the light source and the beam splitter and configured to change a light amount ratio between the reference beam and the measurement beam to any ratio;
a light synthesizer that is configured to synthesize the reference beam and the measurement beam reflected on the target surface;
a light receiver that is configured to receive a synthesized beam of the reference beam and the measurement beam;
a measurement beam splitter provided in a light path of the measurement beam from the beam splitter to the light synthesizer and configured to split the measurement beam to obtain a partial measurement beam;
a measurement beam detecting sensor configured to detect a light amount of the partial measurement beam obtained by the measurement beam splitter; and
a controller comprising:
a storage configured to store a program therein;
a processor configured to read the program stored in the storage and perform a processing; and
a light ratio controller configured to control the λ/2 plate so that the light amount detected by the measurement-beam detecting sensor does not exceed a light amount received for saturation and is equal to or exceeds a predetermined amount not to affect a measurement accuracy.

* * * * *